(12) United States Patent
Weiershausen et al.

(10) Patent No.: US 7,715,717 B2
(45) Date of Patent: May 11, 2010

(54) PROCESSES AND DEVICES FOR THE DETERMINATION OF A PMD-INDUCED OUTAGE PROBABILITY OF AN OPTICAL TRANSMISSION SYSTEM

(75) Inventors: Werner Weiershausen, Eppertshausen (DE); Arnold Mattheus, Darmstadt (DE); Ralph Leppla, Darmstadt (DE); Yutaka Miyamoto, Tokyo (JP); Akira Hirano, Tokyo (JP); Yoshiaki Kisaka, Tokyo (JP)

(73) Assignees: Deutsche Telekom AG, Bonn (DE); Nippon Telegraph and Telephone Corporation, Tokyo (JP)

( * ) Notice: Subject to any disclaimer, the term of this patent is extended or adjusted under 35 U.S.C. 154(b) by 910 days.

(21) Appl. No.: 10/564,461

(22) PCT Filed: Sep. 3, 2004

(86) PCT No.: PCT/EP2004/009848

§ 371 (c)(1),
(2), (4) Date: Sep. 11, 2006

(87) PCT Pub. No.: WO2005/025098

PCT Pub. Date: Mar. 17, 2005

(65) Prior Publication Data

US 2007/0031147 A1        Feb. 8, 2007

(30) Foreign Application Priority Data

Sep. 4, 2003   (DE) ............................... 103 41 257

(51) Int. Cl.
*H04J 14/06* (2006.01)
(52) U.S. Cl. ............................... 398/65; 398/27; 398/81
(58) Field of Classification Search ............. 398/27–28, 398/33, 65, 81, 136
See application file for complete search history.

(56) References Cited

U.S. PATENT DOCUMENTS 5,583,903 A * 12/1996 Saito et al. ..................... 378/19

(Continued)

FOREIGN PATENT DOCUMENTS

EP        0 578 380        1/1994

(Continued)

OTHER PUBLICATIONS

English Translation of Office Action from corresponding JP application No. 2006-525117 dated Jul. 7, 2008.

(Continued)

*Primary Examiner*—Dzung D Tran
(74) *Attorney, Agent, or Firm*—Ohlandt, Greeley, Ruggiero & Perle, L.L.P.

(57) ABSTRACT

The present invention proposes a method whereby during a specified/specifiable observation period ($T_{total}$), the polarization states of optical transmission system and/or the optical signals transmitted by the optical transmission system are changed by applying a targeted intervention in at least one position of the transmission line, and at a second position which is interposed at least one place downstream from the first position of the optical transmission line, a specified/specifiable signal characteristic (BER) is qualitatively measured and checked for adherence to a specified/specifiable threshold condition ($BER_{th}$) and the PMD-induced outage probability of the optical transmission system is calculated on the basis of the ratio between the length of that share of the time ($T_{out}$), during which the measured signal characteristic fails to meet the threshold condition ($BER_{th}$), to the length of the observation period ($T_{total}$).

17 Claims, 3 Drawing Sheets

U.S. PATENT DOCUMENTS

| | | | | |
|---|---|---|---|---|
| 6,583,903 | B1 | 6/2003 | Way et al. | 359/156 |
| 7,206,517 | B1* | 4/2007 | Yu et al. | 398/152 |
| 2001/0024538 | A1* | 9/2001 | Khosravani et al. | 385/11 |
| 2001/0055133 | A1 | 12/2001 | Yamaguchi et al. | |
| 2002/0131129 | A1 | 9/2002 | Mao | 359/161 |
| 2003/0202798 | A1* | 10/2003 | Chou et al. | 398/159 |

FOREIGN PATENT DOCUMENTS

| | | |
|---|---|---|
| EP | 1 376 907 | 1/2004 |
| JP | 3098339 | 4/1991 |
| WO | WO 02/46715 | 6/2002 |

OTHER PUBLICATIONS

Djupsjöbacka, "Calculation of Signal Outage Due to Polarization Mode Dispersion," IEEE Photonics Technology Letters, Vo. 13, No. 7, Jul. 2001, pp. 660-662.

Sunnerud et al., "Outage Probabilities in PMD Compensated Transmission Systems," Proc. 27$^{th}$ Eur. Conf. On Opt. Comm. (ECOC '01—Amsterdam), pp. 204-205, 2001.

Boroditsky et al., In-Service Measurements of Polarization-Mode Dispersion and Correlation to Bit-Error Rate, IEEE Photonic Technology Letters, vol. 15, No. 4, Apr. 2003, pp. 572-574.

* cited by examiner

PROCESSES AND DEVICES FOR THE DETERMINATION OF A PMD-INDUCED OUTAGE PROBABILITY OF AN OPTICAL TRANSMISSION SYSTEM

CROSS-REFERENCE TO RELATED APPLICATION

The present application is a National Stage application of PCT Application No. EP2004/009848, filed on Sep. 3, 2004, and is claiming priority of German Patent Application No. 103 41 257.3, filed on Sep. 4, 2003, the content of which is herein incorporated by reference.

BACKGROUND OF THE INVENTION

1. Field of the Invention

The invention relates to a process for the determination of a PDM-induced outage probability of an optical transmission system and to devices and systems to implement the process.

2. Description of the Related Art

Polarization mode dispersion (PMD) is a well known property of optical elements, such as, for example, fiber optics, optical multiplexers and optical amplifiers.

An important cause of polarization mode dispersion rests on the phenomenon that upon launching an optical signal in an optical element generally several so-called polarization modes are initiated which propagate at different speeds. An initiation of several modes of polarization may, for example, also be the consequezce of a change of the refractive index into a single direction as a response to mechanical irregularities, for example, by curvatures, pressure, tension and/or temperature, of an optical element by means of which one of the orthogonal polarization modes is transmitted faster than the others. In total, the different speeds of several polarization modes lead at the output of the optical element to a distortion of the optical signal and are, therefore, the cause of signal degradation.

Now if in an optical transmission system several optical elements are cascaded then accordingly the PMD-induced signal distortions caused within the individual optical elements shall be accumulated. Provided that these distortions of the signal remain within certain tolerance limits, the optical transmission system fundamentally still works within an admissible area.

For example, for a digital optical signal the bit error rate (BER) constitutes a typical measurement of admissible signal changes, whereby above a certain bit rate threshold value ($B_{TH}$) the resulting signal degradation reaches such a proportion that the optical signal transmission has to be classified as flawed in its totality.

Processes for measuring the polarization mode dispersion of individual optical elements are known, for example, from the recommendation "ITU-T-G.650.2", wherein ITU-T stands for a specific committee within the international body "International Telecommunication Union" which devotes itself to standardization in the area of communication engineering and issues corresponding recommendations.

Moreover, there are fundamental models available which state the probability of the occurrence of Differential Group Delays (DGD) in so-called DGD values if the polarizations mode dispersion values have been previously measured.

Publications to be named in this context are, for example, the ITU-T recommendation No. G.691 and the Technical Report (TR) IEC/TR 61282-3 which were issued by the International Electrotechnical Commission (IEC). What should be considered disadvantageous in this context that by making use of the differential group delays it is always only possible to present a part of the effects which are based on polarization mode dispersion.

SUMMARY OF THE INVENTION

As a consequence, it is the task of the invention to provide a mode of measuring technology by which it is possible to determine the outage probability of an optical transmission system based on polarization mode dispersion.

Surprisingly, the solution of the task in accordance with the invention is already given by the subject matter in the form of the characteristics of one of the independent claims.

Advantageous and/or preferred embodiments, and further developments of the invention are the subject matter of the respective dependent claims.

Thus, in accordance with the invention, there is one particular process envisaged for the determination of a PMD-induced outage probability of an optical transmission system, that comprises at least one optical input and one optical output, wherein during a specified/specifiable observation period at not less than one position of the optical transmission line the polarization states of the optical transmission system and/or the optical signals transmitted via the optical transmission system are specifically changed by bringing a targeted intervention to bear. At a second position which is interposed at least one place downstream from the first position of the optical transmission line, a specified/specifiable signal characteristic is qualitatively measured and checked for compliance with a specified/specifiable threshold condition. Then the PMD-induced outage probability of the optical transmission system is calculated on the basis of the ratio of that length of the time to the length of the observation period during which the measured signal characteristic fails to meet the threshold condition.

In the preferred embodiment, the process is applied to an optical transmission line which incorporates a first optical element and a second optical element and may include a multitude of interposed optical elements between the first and the second optical elements, whereby the change of the polarization states of the optical transmission system and/or the optical signals transmitted via the optical transmission system is carried out at the position of the first and/or the following optical elements and the measuring of the signal characteristics is carried out at or close to the second optical element.

Thus, the invention rests on the approach that in order to determine and consequently also for the more detailed specification of a PMD-induced outage probability of an optical transmission system, changes of polarization states are brought about by exerting provoked effects on the optical transmission system and/or the optical signal transmitted through it.

Traditionally, such polarization states in an optical transmission system and the optical signal transported on it are subject to local and temporal fluctuations with time constants ranging from milliseconds up to several weeks, whereby the temporal changes of the polarization states may, inter alia, be a consequence of mechanical influences, such as, for example, vibrations and tensions, effects exerted by temperature and other physical influence and may, for example, vary considerably depending on the type and the number of the optical elements installed or on the prevailing environmental conditions.

Even through specific variation of individual polarizations, for example the input polarization of the optical signal, whilst retaining the other polarization states of the optical transmission system constant the invention makes it possible for the first time to simulate experimentally the possible or probable polarization states of an optical transmission system and the share of the polarization-induced system outages, in which the signal transmitted by the system lies outside a specified/specifiable tolerance area, within an acceptable timeframe as early as in the design stage of an optical transmission system and/or to measure it in an optical transmission system which is already in operation. Moreover, the invented process may be advantageously applied immediately before the commissioning of a certain optical transmission system in order to carry out such a test measurement.

Thus the invented process is structured to be suitable to be applied to a real optical transmission line as well as to a computer simulation to be applied to a model of an optical transmission line, whereby essentially every optical transmission system can be co-opted to be used to implement the process. For an apparatus mapped to carry out the invented process it is already sufficient if the apparatus includes a device in at least in one position which permits the exertion of an effect during a specified/specifiable observation period at a minimum of one position along the optical transmission line in such a manner that the polarization states of the optical transmission system or the optical signals transmitted by the optical transmission system are changeable and that the apparatus also includes a device at not less than one second subsequent position for the qualitative measurement of a specified/specifiable characteristic during the specified/specifiable observation period for checking the specified/specifiable threshold condition as well as a device for the calculation the ratio to the observation period of that share of time during which the measured signal characteristic has failed to meet the threshold condition.

In accordance with a further preferred embodiments, it is envisaged to measure or indirectly determine the signal characteristic directly at the second optical element, in particular by diverting a share of the transmitted optical signal, for example, by means of an optical couple, in front of the second optical element.

In order to warrant a further improved and essentially realistic statement about the share of polarization-induced system outages in a further preferred embodiment of the invention, all or at least many variable polarization states are tested in the optical transmission system during a specified/specifiable observation period. By running through all polarization states it is in each case examined whether the optical signal still lies within or already outside the tolerance area and on the basis of this, the PMD-induced, i.e. polarization-dependent outage probability of the optical transmission system is determined.

In this context, it is particularly suggested to change the polarization states of the optical transmission system and/or the optical signals transmitted via the optical transmission system by means of launching and/or passing on of optical signals, which are to be transmitted, with varied polarization states.

If, within the framework of a further particularly preferred embodiment, a multitude of polarization states are run through simultaneously or successively during the observation period, in particular if these are varied in an automated manner, and at the respective settings or combinations of settings the signal characteristic is correspondingly measured and checked in relation to the threshold condition, then the PMD-induced outage probability of the optical transmission system may be conveniently calculated on the basis of the ratio formed between the sum of all those shares of time during which the measured signal characteristic failed to meet the threshold value and the length of the observation period.

Depending particularly on the respective application of the transmission system and/or depending on whether the signal to be transmitted is an analog or a digital signal, the measurement of a bit error rate, an eye diagram or of a signal amplitude has proven itself to be suitable as signal characteristic.

For this purpose, the respective threshold condition can be specified in an application-specific manner as maximum or minimum value for the signal characteristic.

The use of at least one polarization actuator and/or at least of a polarization scrambler has proved itself advantageous for the variation of the polarization states, in particular for the shortening of the observation or the measuring period.

These may, for example, already be integrated into the transmission line or be used as part of the invented apparatus.

However, it is further proposed as a supplement or as an alternative for particularly preferred developments to use a modified optical transmission system to determine the outage probability by applying corresponding or further additional measures and subsequently to determine the outage probability of the optical transmission system without modification by inference.

Thus, in this context it has proven itself to be advantageous, for instance in cases where the probability of outage is very low and is hardly measurable by statistical means or at all to initially use an absorptive attenuator when implementing the process in order to shorten the observation period.

The invention is described in what follows by making use of preferred embodiments and by referring to the attached drawings in more detail.

BRIEF DESCRIPTION OF THE DRAWINGS

The drawings illustrate

DESCRIPTION OF THE INVENTION

The invented process for the determination of a PMD-induced Outage Probability (OP), which is described in the following example which may be carried out at an actual optical transmission line or also be means of a computer simulation using a model, relates to the outage probability which is caused by the PMD-induced degradation of an analog or digital optical signal between not less then two optical elements of an optical transmission system of which one is a first optical element and the second is the second optical element.

In this case, the optical elements may be adjoining or also form parts of the transmission line described above. Consequently, the invention allows the determination of the outage probability caused by the PMD-induced degradation of the optical signal between transmitter and receiver or between two other, essentially arbitrary optical elements of the optical transmission system.

Owing to this, it is also possible locate individual optical elements, which ultimately make a material contribution to an increased outage probability of the optical transmission system as a whole, in a targeted manner, for example through correspondingly isolating test series and render them less susceptible to polarization dispersion by optimizing the parameters, if appropriate, or by means of other measures.

The invented process is based in accordance with the particularly preferred embodiment on the fact that at the first optical element, or at several of the first optical elements the polarization states of the optical transmission system are specifically modified and, during the optical signal transmission within a specified/specifiable observation period $T_{total}$ at the second optical element, i.e. at the end of a partial or simulated optical transmission line which is specifically observed for PDM-based signal degradation, a certain signal characteristic, which represents the signal quality, is measured and subsequently checked against a specified/specifiable threshold value.

Figure 1:
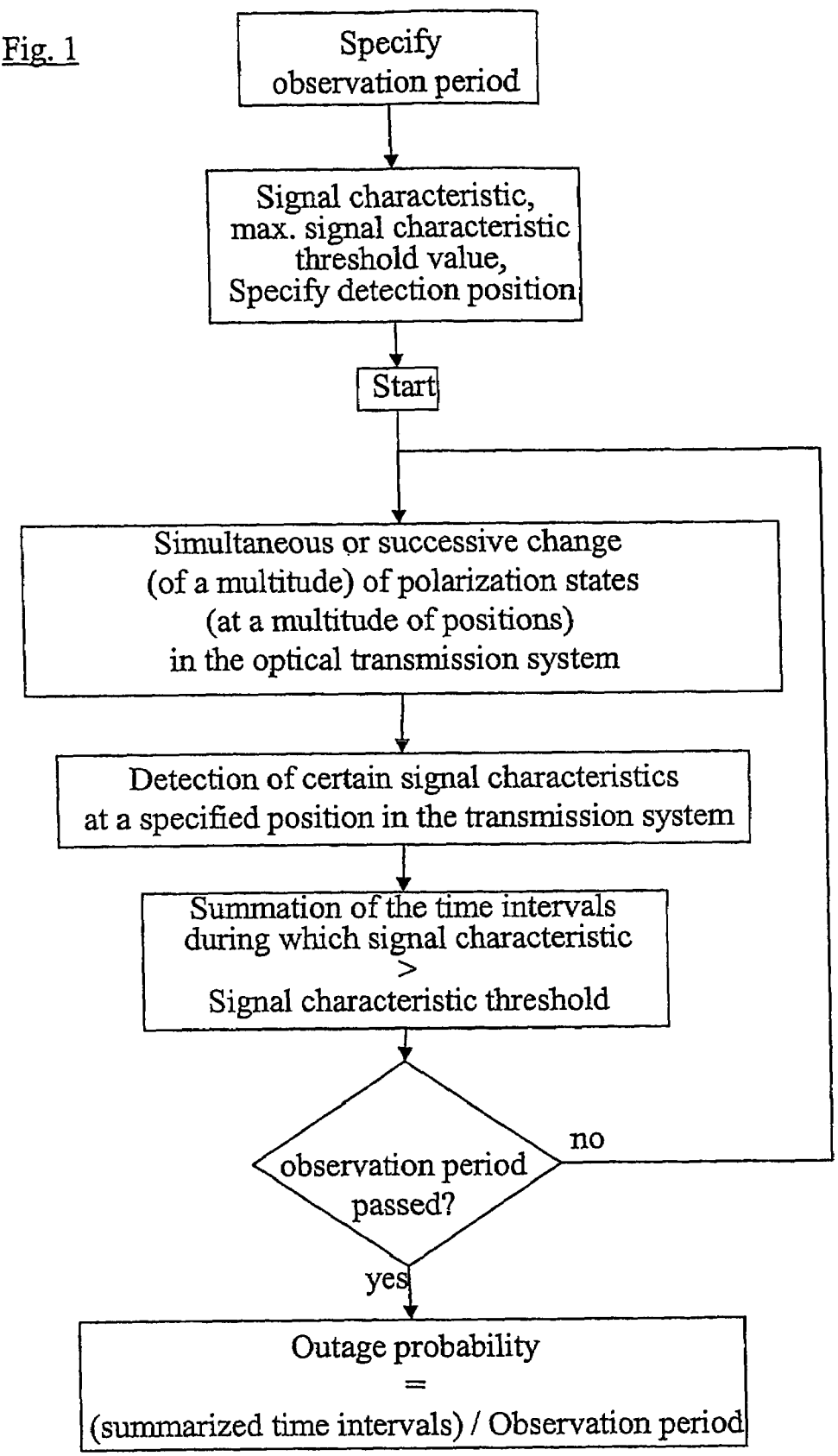
FIG. 1 a radically simplified flow diagram, relating to a modus operandi which is given as an example approach for the invented process, FIG. 2 a diagram which represents a outage probability based on a bit error rate of a digital optical signal, and FIG. 3 a radically simplified example of an optical transmission system for the measurement of the optical outage probability which comprises two glass fiber sections with interposed polarization scramblers and polarization controllers.

Thus, in relation to FIG. 1, the value for the PMD-induced outage probability is calculated on the basis of the observation period $T_{total}$, which is related to a share of the time $T_{out}$, during which the optical signal at the selected second optical element no longer complies with the threshold condition, i.e. either lies above the specified maximum signal characteristic threshold value or below a minimum signal characteristic threshold value. Thus, it is generally possible to glean the PMD-induced outage probability from $T_{out}/T_{total}$.

In practical terms, all or a multitude of the possible polarization states of the optical transmission system, also particularly the polarizations of the optical signal and the polarization states of the elements which are incorporated in the optical transmission line under observation, are tested one by one. As the differential group delays and thus the polarization mode dispersion which takes place upon testing through the individual polarization states along the transmission line change with the time. The share of the time $T_{out}$ may be calculated from the sum of the individual time intervals $T_{out-n}$, where the threshold condition is no longer met, in relation to the total observation period. If $T_{out-n}$, with $n \in N, n \geq 1$, denotes the respective $n^{th}$ time interval within the observation period $T_{total}$, in which the threshold condition is not met, then the PMD-induced outage probability is be calculated as follows:

$$\left(\sum_n T_{out-n}\right) / T_{total}.$$

In doing so, the testing of the individual polarization states is preferably carried out simultaneously, however, it may also be done successively. Furthermore, it has been proven that regardless of the fact that the polarization states set at any given moment are practically accidental after only short observation periods $T_{total}$, e.g., depending on the system even after a few seconds or minutes, an outage probability emerges which remains constant over the time.

Thus, essentially all the different polarization states which may occur during the useful life of an optical transmission system in its individual optical elements, in the optical transmission system as a whole and in the optical signal can be set in a reasonable time. In practice it would be necessary to wait several months until all these possible polarization states with which one has to reckon with in the subsequent system operation would have occurred. Over and above this, the invention makes it possible to provide a statement about short-term fluctuations in polarization and their impact on the optical signal for which it would be necessary to implement a monitoring program lasting for months which could hardly be carried out, if at all.

In this context, the testing of the polarization states of the optical signal and of the individual optical elements may be changed by external and/or intervention depending on the specific application. The preferred option envisaged for an existing system in order to initiate several polarization modes is to launch the optical signal to be transmitted at different or preferably a multitude of different locations. In practice also the changing of the polarization states of the individual optical elements should be brought about by changing the input polarization states of the signal in front of the optical elements concerned.

For example, even the pre-selection/adjustment of optical elements during the development phase of an optical transmission system to be implemented can consequently be ensured in a simple manner by the use of a corresponding computer simulation of the optical transmission system.

In all the settings brought about by this or combinations of settings of the polarization states it is in each case measured whether the second selected optical element still meets the threshold conditions or not and thereafter the outage probability for the transmission system is calculated.

A signal characteristic representing the signal quality for this purpose may be measured, for example, in the form of a bit error rate (BER), the number of corrected symbol errors of an error protection coding (Forward Error Correction, FEC), of a Q factor, an eye diagram and/or the amplitude of the signal. For the direct measurement of the signal quality, the optical elements may, for example, be coupled to corresponding monitoring devices which are as a result preferably structured to measure a BER, the number of corrected symbol errors of a forward error correction, a Q factor and/or an eye diagram. Also an indirect determination of the signal characteristic is possible, for example, by the diverting a part of the optical signal ahead of the second, subsequent optical element by means of an optical coupler. In consequence, the optical transfer system malfunctions between the first and second optical elements if the signal characteristic measured at the second optical element no longer meets a certain threshold value. In accordance with the signal characteristics to be preferred for measurement as highlighted above, the examples to be named for such threshold conditions are a maximum bit error rates $BER_{th}$, a maximum deterioration of the eye aperture or even a maximum admissible analog signal distortion, in particular a maximal increase of the amplitude.

Figure 2:
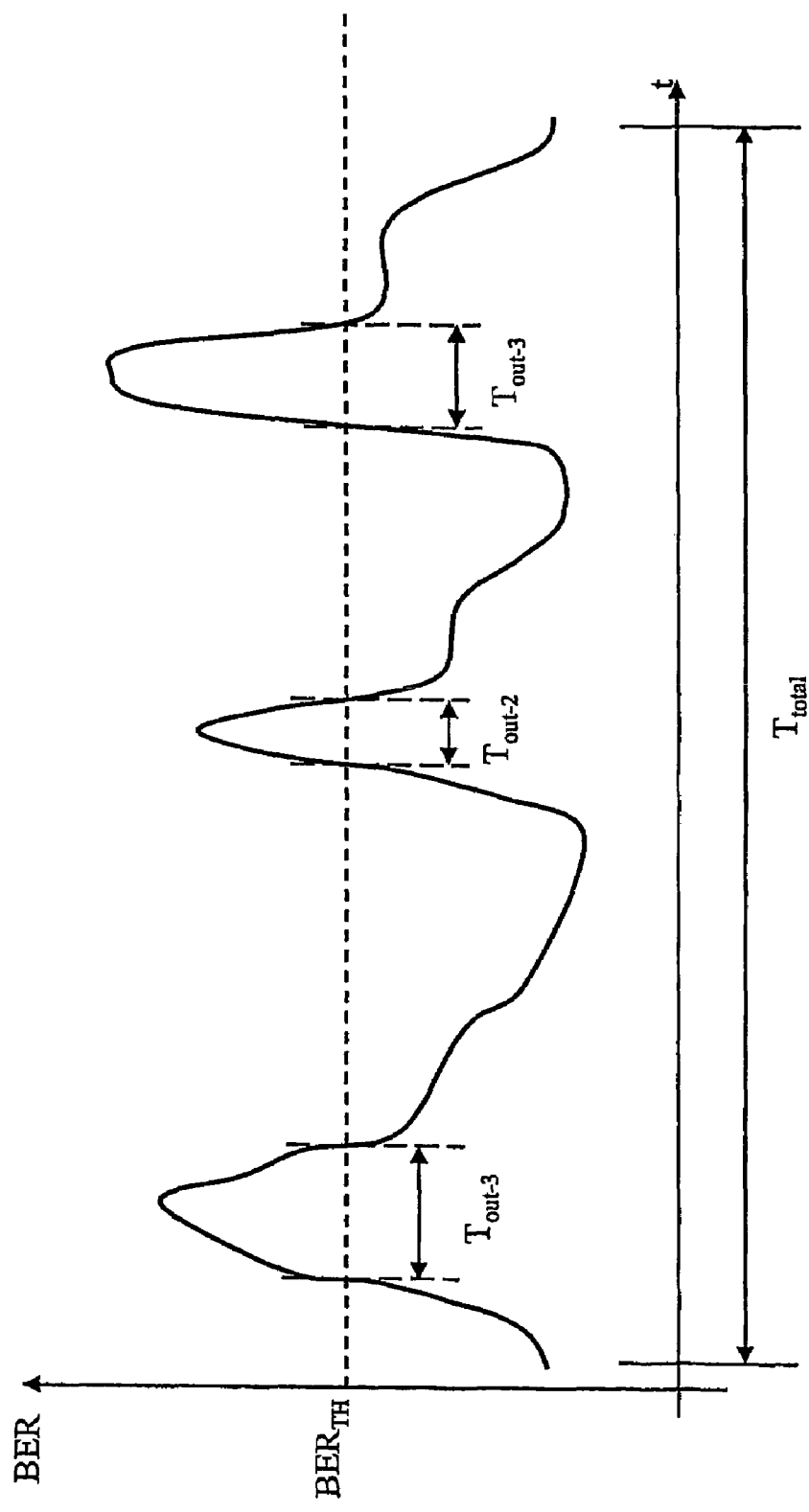

FIG. 2 shows as an example a recorded time diagram for the determination of the PMD-induced outage probability, which is represented by the time intervals $T_{out}$, $T_{out-2}$, and $T_{out-3}$ which exert an influence on the outage probability based on the bit error rate of an optical signal, within which the threshold condition $BER_{th}$ of a maximal bit error rate is no longer met.

As may be gleaned from the previous description, the invented process may be applied as a matter of principle to every optical transmission system which fundamentally comprises a number of optical elements which may be configured in any arbitrary topological form, including those connected in series and/or in parallel.

Any respective optical element may have an arbitrary number of optical inputs and outputs, but possesses at least one input and one output. Therefore, examples for such elements are optical transmitters, optical receivers, glass fibers, open air lines, optical multiplexers, optical de-multiplexers, and optical amplifiers or PMD compensators. An optical transmission system frequently incorporates an optical transmission line comprising serially configured optical elements wherein the optical transmission line starts with a transmitter ($T_x$) 10 and ends on with receiver ($R_x$) 20.

Figure 3:
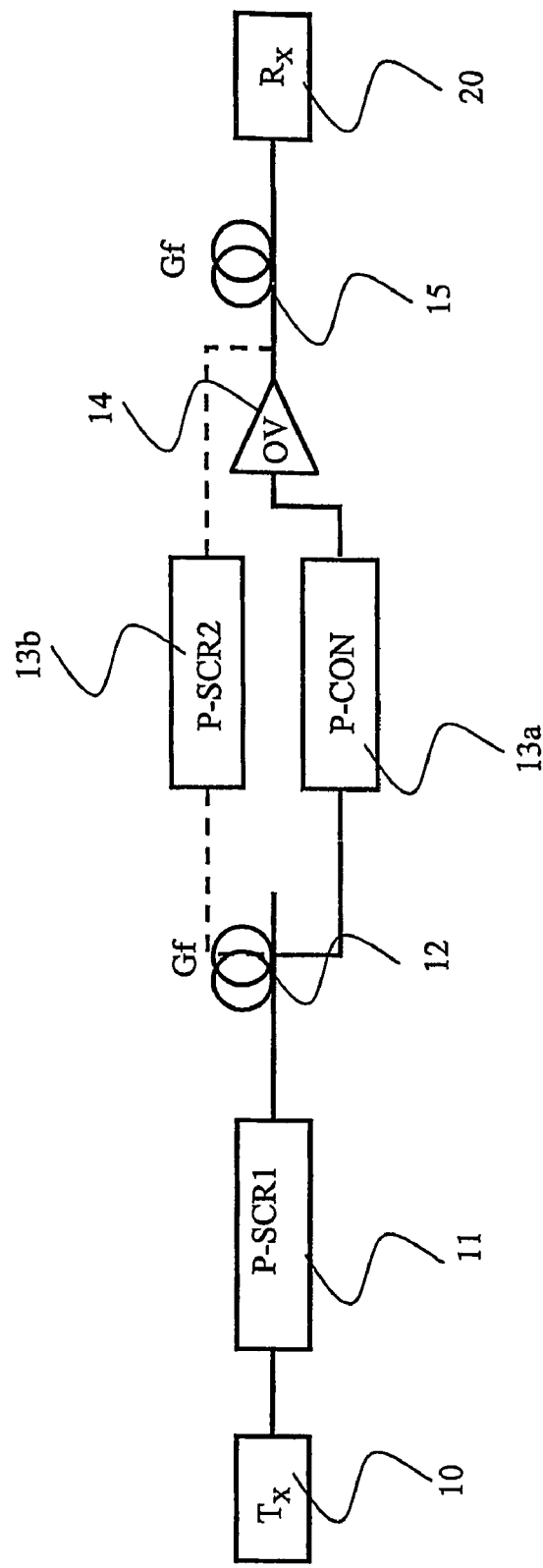

FIG. 3 shows in a radically simplified manner two optical transmission systems at which the invented process was examined in a, manner close to practical operations.

The optical transmission system in accordance with FIG. 2 comprises an optical transmission line with serially configured optical elements 10, 11, 12, 13a, or 13b, 14, 15 and 20 wherein the fiber optic sections 12, 15 and other optical elements 10, 11, 13a or 13b, 14, 15 and 20 largely alternate. In detail, the optical transmission system in accordance with FIG. 1 comprises a first polarization scrambler (P-SCR1) between the optical transmitter ($T_x$) 10 and the optical receiver ($R_x$) 20, a first fiber optic section (Gf) 12, in an initial schematic embodiment a polarization controller (P-CON) 13a or in a first schematic embodiment a second polarization controller (P-SCR2) 13b, an optional optical amplifier (OA) 14 and a second fiber optic section (Gf) 15.

It should be pointed out that in practice, the use and the respective configuration of polarization controllers and/or polarization scramblers is largely governed by the respective other optical elements used and their specific parametric values.

The frequent use of polarization controllers or polarization actuators for intentionally changing the polarization of the incident light and/or of polarization scramblers for the variation of the polarization over all possible polarization states and grades has led to a cut in the time required for determining the PMD-induced outage probability which has in turn proved itself to be very useful. Furthermore by using such polarization actuators and/or polarization scramblers, the simultaneous and successive variation of polarization states at a multitude of different positions along a transmission line can be ensured.

A further possibility to shorten the time required to determine the PMD-induced outage probability consist, for example, of changing the optical transmission system in a targeted manner compared to the transmission system actually deployed and to determine the outage probability for the modified optical transmission system in order to draw conclusions subsequently about the outage probability of the optical system without making this change. This possibility has proven itself to be particularly useful at times at which the time required for measurement and simulation is too long, since in such a case the outage probability is too small and difficult to measure, if at all.

By introducing an attenuating member, for example, in front of the optical receiver 20, which would be removed in actual operation, the outage probability was determined with this additional attenuation which cut the time for the measurement considerably in comparison to measurement without additional attenuation. For practical purposes, such a measurement is carried out with differing additional attenuation values such that for each the individual, attenuation value respective outage probabilities are determined and in this manner the outage probability of the optical transmission system can be subsequently determined without an additional attenuating member simply by inference.

In accordance with the invented process of being able to generate a multitude of polarization states by means of imposing a provoked effect on an optical transmission system and on the signal transmitted via the system, it is possible to determine the PMD-induced outage probability for optical transmission systems in a manner which is not only effective but also close to reality.

In consequence, the possible and/or probable polarization states of an optical transmission system and the share of the system outages caused by such polarization, wherein the polarization states lead to such distortions causing the optical signals transmitted by the system to lie outside a specified tolerance area, are experimentally measurable and/or capable of being simulated within a reasonable timeframe.

What is claimed is:

1. A method for determining a PMD-induced outage probability of an optical transmission system, which includes an optical transmission line having at least one optical input and at least one optical output, during a specified/specifiable observation period, comprising:
    within the observation period and in at least one first position of the transmission line, changing polarization states of the optical transmission system and/or optical signals transmitted by the optical transmission system by bringing a targeted intervention to bear,
    at a second position, which is interposed at least one place downstream from the first position of the optical transmission line, quantitatively measuring at least one specified/specifiable signal characteristic,
    checking the signal characteristic for compliance with a specified/specifiable threshold condition,
    calculating the PMD-induced outage probability of the optical transmission system on the basis of a ratio of a length of time during which the measured signal characteristic fails to meet the threshold condition to a length of the observation period.

2. The method of claim 1, wherein the method is applied to an optical transmission line which includes a first optical element, a second optical element, and a multitude of additional optical elements imposed between the first optical element and the second optical element,
    wherein the changes of the polarization states of the optical transmission system and/or the signals transmitted by the optical transmission system are carried out at the position of the first element and/or the additional optical elements, and the measurement of the at least one signal characteristic is carried out at or close to the second optical element.

3. The method of claim 2, wherein the at least one signal characteristic is either directly measured or indirectly determined at the second optical element.

4. The method of claim 3, wherein the at least one signal characteristic is indirectly determined by diverting a part of the transmitted optical signals upstream of the second optical element.

5. The method of claim 1, wherein the change in the polarization states of the optical transmission and/or the optical signals transmitted by the optical transmission system are implemented by launching and/or transmitting the optical signals with varied polarization states.

6. The method of claim 1, wherein during the observation period, a multitude of the polarization states are tested simultaneously or successively during the observation period,
    wherein for respective settings or combinations of settings, the at least one signal characteristic is correspondingly measured and checked against the threshold condition, and
    wherein the ratio is a ratio a sum of all shares of the time, during which the signal characteristics measured fail to meet the threshold condition, to the observation period.

7. The method of claim 6, wherein the multitude of the polarization states are tested in an automated manner.

8. The method of claim 1, wherein the method is carried out using a digital or analog signal.

9. The method of claim 1, wherein the signal characteristic is measured as a characteristic selected from the group consisting of a bit error rate, an eye diagram, and an amplitude of the signal.

10. The method of claim 1, further comprising specifying a maximum and/or a minimum signal characteristic value as a threshold value.

11. The method of claim 1, further comprising modifying the optical transmission system for carrying out the process in its entirety so that the outage probability of the optical transmission system is determined for the modified transmission system and the outage probability of the optical transmission system is determined without modification by inference.

12. The method of claim 1, further comprising introducing an attenuator to reduce the observation period, for carrying out the method.

13. The method of claim 1, wherein changing the polarization states is accomplished by using at least one polarization controller and/or at least one polarization scrambler.

14. The method of claim 1, wherein the optical transmission line is a real optical transmission line.

15. An apparatus for carrying out a method for the determination of a PMD-induced outage probability of an optical transmission system which has an optical transmission line that includes at least one optical input and at least one optical output, comprising:
- a device for applying a targeted intervention during a specified/specifiable observation period in at least one first position of the optical transmission line so that polarization states of the optical transmission system and/or signals transmitted by the optical polarization system are modifiable,
- a device for qualitatively measuring the specified/specifiable observation period of at least one specified/specifiable signal characteristic at a second position which is interposed in at least one place downstream from the first position of the optical transmission line,
- a device for checking the measured signal characteristic in relation to a specified/specifiable threshold value, and
- a device for calculating a ratio of the share of a time period, during which the measured signal characteristic has failed to meet the threshold condition, to the observation period.

16. A method for determining a PMD-induced outage probability of an optical transmission system, which includes an optical transmission line having at least one optical input and at least one optical output, during a specified/specifiable observation period, comprising:
- within the observation period and in at least one first position of the transmission line, changing polarization states of the optical transmission system and/or optical signals transmitted by the optical transmission system by bringing a targeted intervention to bear,
- at a second position, which is interposed at least one place downstream from the first position of the optical transmission line, quantitatively measuring at least one specified/specifiable signal characteristic,
- checking the signal characteristic for compliance with a specified/specifiable threshold condition,
- calculating the PMD-induced outage probability of the optical transmission system on the basis of a ratio of a length of time during which the measured signal characteristic fails to meet the threshold condition to a length of the observation period,
- wherein during the observation period, a multitude of the polarization states are tested simultaneously or successively during the observation period,
- wherein for respective settings or combinations of settings, the at least one signal characteristic is correspondingly measured and checked against the threshold condition, and
- wherein the ratio is a ratio a sum of all shares of the time, during which the signal characteristics measured fail to meet the threshold condition, to the observation period.

17. The method of claim 16, wherein the multitude of the polarization states are tested in an automated manner.

* * * * *